UNITED STATES PATENT OFFICE.

ERNST H. RICHTER, OF TAUNTON, MASSACHUSETTS.

IMPROVEMENT IN COMPOSITION FUEL.

Specification forming part of Letters Patent No. 116,489, dated June 27, 1871.

*To all whom it may concern:*

Be it known that I, ERNST H. RICHTER, of Taunton, in the county of Bristol and State of Massachusetts, have invented a new and useful or Improved Composition for use as a Fuel; and do hereby declare the same to be described as follows:

In compounding such composition I take one ton of finely-divided anthracite or bituminous coal and make the same, with water, into a stiff mortar or paste, with one hundred pounds of white clay, such as is used in making fire-brick; or with one hundred pounds of blue clay, such as is used in making the ordinary red brick; or with one hundred pounds of both of these clays mixed, and fifty pounds of the Dutch, German, or Swedish clay, such as is employed for making crucibles. This mortar, after having been well made, is to be molded into the requisite form or forms for use.

I do not confine my composition to the precise proportions of its ingredients as above stated, as they may be varied somewhat and still be productive of good results. I am aware that it is not new to mix common clay with fine coal to enable such to be molded and used as a fuel, and therefore I make no claim thereto; nor do I claim the combination of either one of the above-mentioned clays alone with anthracite or bituminous coal, as I have found that neither of them will be productive of the advantages which result from the use of a combination of two or more of these clays with the carbonaceous matter. Neither the white nor blue clay, alone with the coal, will give to the composition the necessary consistency; but by adding the crucible or German clay (under which name it is generally known and sold in the market) I insure all the consistency desirable to enable it to be handled and burned to advantage. The German clay seems, also, to facilitate combustion, as the whole mass, when burned, becomes thoroughly reduced to ashes.

I claim as my invention—

The composition or fuel, as hereinbefore explained, made of a carbonaceous material and the three different kinds of clay mixed together, substantially as described, in or about in the proportions, and molded, as hereinbefore set forth.

ERNST H. RICHTER.

Witnesses:
SAML. L. CROCKER,
R. HENRY HALL.